United States Patent [19]

Suzuki et al.

[11] 4,316,657
[45] Feb. 23, 1982

[54] APPARATUS FOR ELECTRICALLY DETECTING FOCAL POINT OF CAMERAS OR THE LIKE OPTICAL DEVICES

[75] Inventors: Takeomi Suzuki, Tokyo; Masatoshi Ida, Hachioji; Hideyuki Kenjyo, Koganei, all of Japan

[73] Assignee: Olympus Optical Company Limited, Tokyo, Japan

[21] Appl. No.: 52,225

[22] Filed: Jun. 26, 1979

[30] Foreign Application Priority Data

Jul. 3, 1978 [JP] Japan .................. 53-79741

[51] Int. Cl.³ .................. G03B 3/10; G03B 19/12; G01J 1/44
[52] U.S. Cl. .................. 354/23 D; 354/25; 354/31; 354/60 A; 354/152; 250/201
[58] Field of Search .............. 354/23 D, 25, 31, 60 A, 354/25 A; 352/140; 250/201, 204, 209; 356/1, 4; 340/347 AD

[56] References Cited

U.S. PATENT DOCUMENTS

| | | | |
|---|---|---|---|
| 2,828,482 | 3/1958 | Schumann | 340/347 AD |
| 3,582,940 | 6/1971 | Kihlberg | 340/347 AD |
| 3,588,876 | 6/1971 | Chatelon et al. | 340/347 AD |
| 4,047,187 | 9/1977 | Mashimo et al. | 354/23 D |
| 4,162,839 | 7/1979 | Mashimo et al. | 354/23 D |
| 4,173,402 | 11/1979 | Horike et al. | 354/25 |

FOREIGN PATENT DOCUMENTS

2513027 10/1975 Fed. Rep. of Germany ...... 250/201

Primary Examiner—L. T. Hix
Assistant Examiner—William B. Perkey
Attorney, Agent, or Firm—Stevens, Davis, Miller and Mosher

[57] ABSTRACT

An apparatus for comparing analog signals delivered from a number of light detecting elements with analog signals delivered from a digital-analog converter by means of a plurality of comparator circuits whose output analog signals are supplied as write enable signals to a plurality of digital memories which are controlled by means of digital signals delivered from a central control circuit such that an illumination intensity information of each picture element is read out as the digital signal in the digital memories, thereby obtaining a signal of detecting a focal point of cameras or the like optical devices.

2 Claims, 5 Drawing Figures

APPARATUS FOR ELECTRICALLY DETECTING FOCAL POINT OF CAMERAS OR THE LIKE OPTICAL DEVICES

BACKGROUND OF THE INVENTION

1. Field of the Invention

This invention relates to an apparatus for electrically detecting a focal point of cameras or the like optical devices such as a microscope, high density optical recording and reproducing device or the like with the aid of a picture image signal treating circuit or the like.

2. Description of the Prior Art

As a conventional apparatus for electrically detecting a focal point of cameras or the like optical devices, it has been proposed to use a light receiving device including a number of light detecting elements, project an optical image whose focal point is to be detected on the light receiving device so as to obtain a picture element information from each of the light detecting elements, and obtain a focal point detecting signal on the basis of such picture element information. In this case, a number of picture element informations are obtained. In order to treat these picture element informations so as to obtain the focal point detecting signal, it is necessary to carry out complex steps. In general, it is preferable to digitally treat the picture element informations. In this case, it is a matter of course that an illumination intensity information obtained from each picture detecting element must be converted into a digital information. Various kinds of apparatuses for treating the illumination intensity information from a number of picture element informations for the purpose of detecting the focal point of the cameras or the like optical devices have heretofore been proposed. In all of these conventional apparatuses, each picture element is scanned by a light image in succession to derive corresponding illumination intensity as an analog amount which is then converted in succession into a digital amount. As a result, if the number of the picture elements becomes large, a considerably long time is required for the analog-digital conversion. In order to eliminate such drawback, if use is made of analog-digital converters which are the same in number as the picture elements for the purpose of simultaneously effecting all of the analog-digital conversions in parallel, a significantly large number of the analog-digital converters are required, thereby making the apparatus complex in construction.

SUMMARY OF THE INVENTION

An object of the invention, therefore, is to provide an apparatus for electrically detecting a focal point of cameras or the like optical devices with the aid of a picture image signal treating circuit including a digital-analog converter, which is simple in construction and which can simultaneously convert analog illumination intensity informations of a number of picture elements in parallel into digital informations.

A feature of the invention is the provision of an apparatus for electrically detecting a focal point of cameras or the like optical devices with the aid of a picture image signal treating circuit, comprising a light receiving device composed of a number of light detecting elements arranged in a plurality of groups, a selection circuit for selectively operating one of these plurality of groups, a plurality of comparator circuits for comparing output analog signals from the plurality of light detecting elements with a common reference signal, a central control circuit for controlling the plurality of light detecting elements, selection circuits and comparator circuits and generating a digital signal, a digital-analog converter for converting the digital signal generated from the central control circuit into an analog signal and supplying the analog signal as a reference signal to the comparator circuit, and a plurality of digital memories for receiving the output from the comparator circuit as a write enable signal and memorizing the digital signal generated from the central control circuit.

Further objects and features of the invention will be fully understood from the following detailed description with reference to the accompanying drawings, in which:

DETAILED DESCRIPTION OF THE PREFERRED EMBODIMENTS

Figure 1:
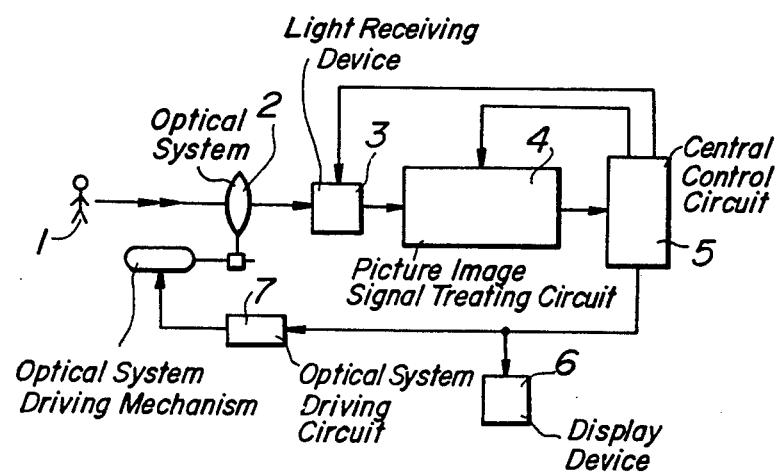
FIG. 1 is a block diagram of one embodiment of an apparatus for electrically detecting a focal point of cameras or the like optical devices with the aid of a picture image signal treating circuit according to the invention.

FIG. 1 shows one embodiment of an apparatus for electrically detecting a focal point of cameras or the like optical devices with the aid of a picture image signal treating circuit according to the invention. In the present embodiment, an image of an object 1 to be photographed is projected through a photographic optical system 2 onto a light receiving device 3 including a number of light detecting elements, that is, picture element regions. An illumination intensity information of each picture element region of the light receiving device 3 is supplied to a picture image signal treating circuit 4 which functions to convert all of the illumination intensity informations in parallel into digital informations. The digital informations thus obtained are supplied in succession to a central control circuit 5 which functions to suitably treat the digital informations so as to obtain a focal point detecting signal which displays the condition that the optical system 2 is in focus. This focal point detecting signal is supplied to a display device 6 which functions to notify a photographer that the optical system 2 is in focus. The focal point detecting signal is also supplied through an optical system driving circuit 7 to an optical system driving mechanism 8, thereby adjusting the focal point of the optical system 2. In a simple apparatus, the optical system 2 may manually be driven by the photographer in response to the indication given by the display device 6 and the driving circuit 7 and driving mechanism 8 may be omitted.

Figure 2:
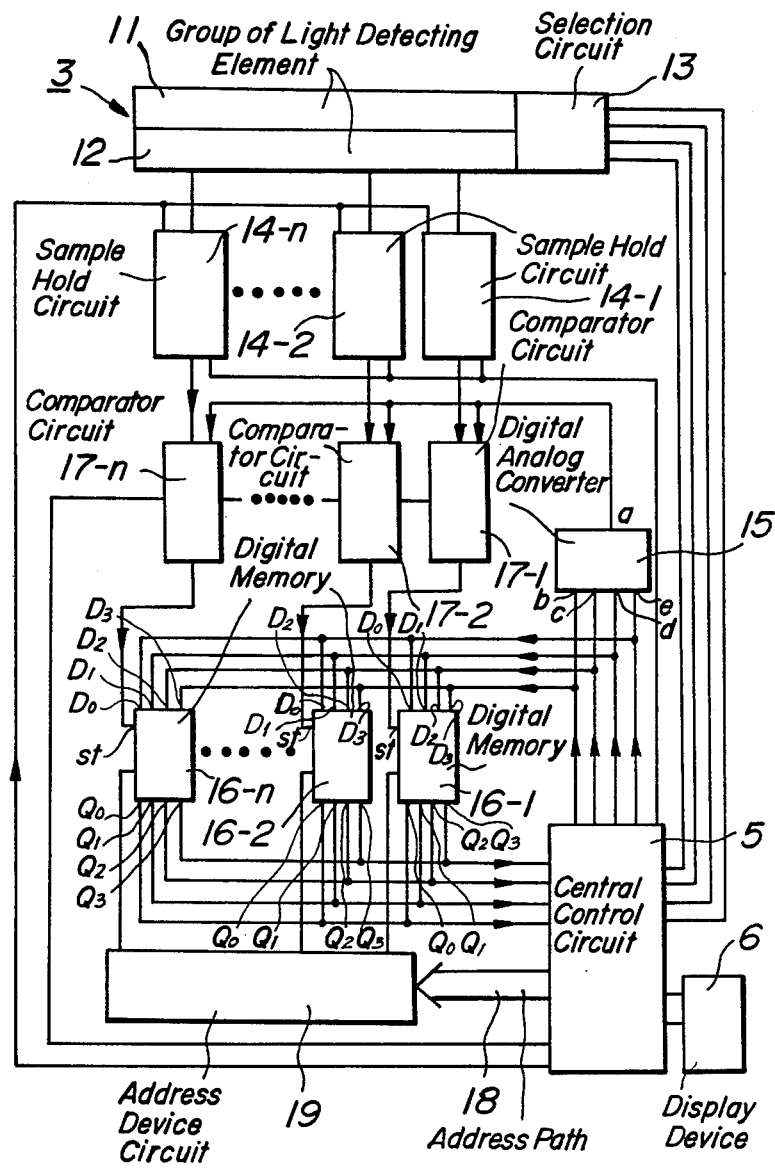
FIG. 2 is a block diagram of one embodiment of the picture image signal treating circuit shown in FIG. 1.

FIG. 2 shows one embodiment of the light receiving device 3, picture image signal treating circuit 4 and central control circuit 5 shown in FIG. 1 in greater detail. In the present embodiment, the light receiving device 3 includes a number of light detecting elements, that is, picture elements divided into two groups 11, 12. These two groups 11, 12 are selectively operated through a selection circuit 13 by means of a central control circuit 5.

If the group 11 of the light detecting elements is selectively operated, illumination intensity informations of n picture elements for constituting the groups 11 of the light detecting elements are supplied in parallel to and held by sample hold circuits or analog memories 14-1, 14-2, . . . 14-n corresponding to respective picture elements. The central control circuit 5 functions to supply digital signals whose values are increased in succession to a digital-analog converter 15 and digital memories 16-1, 16-2, . . . 16-n.

The digital analog converter 15 serves to convert the digital signals into analog signals which are then supplied to one of the input terminals of comparator circuits 17-1, 17-2, . . . 17-n, respectively. The other input terminals of the comparator circuits 17-1, 17-2, . . . 17-n are connected to the output terminals of the sample hold circuits 14-1, 14-2, . . . 14-n, respectively. Everytime the digital signals delivered from the central control circuit 5 vary their values, the comparator 17-1, 17-2, . . . 17-n serves to compare the values of the analog signal held by the sample hold circuit 14-1, 14-2, . . . 14-n and representing the illumination intensity of each picture element for constituting the group 11 of the light detecting elements with the analog signal corresponding to the digital signal delivered from the central control circuit 5. The digital signal delivered from the central control circuit 5 changes from a small value to a large value in succession, so that the analog signal supplied from the digital-analog converter 15 to the comparator circuits 17-1, 17-2, . . . 17-n is also gradually increased. When such gradually increased analog signal exceeds the value of the analog signal held by the sample hold circuit 14-1, 14-2, . . . 14-n, the output from the comparator circuits 17-1, 17-2, . . . 17-n becomes reversed. The outputs from the comparator circuits 17-1, 17-2, . . . 17-n are supplied to digital memories 16-1, 16-2, . . . 16-n, respectively. When the outputs from the comparator circuits 17-1, 17-2, . . . 17-n are reversed, the digital signals supplied from the central control circuit 5 to the digital memories 16-1, 16-2, . . . 16-n are memorized in these digital memories.

For example, let the digital signal delivered from the central control circuit 5 be 4 bits and let the output from the comparator circuit 17-2 be reversed when 0011 is delivered from the central control circuit 5, 0011 is memorized in the digital memory 16-2. If the comparator circuit 17-5 is reversed from 0100 is delivered from the central control circuit 5, 0100 is memorized in the digital memory 16-5. In this way, during the time at which the digital signal delivered from the central control circuit 5 changes from 0000 to 1111, the illumination intensity signal of each picture element held in the sample hold circuits 14-1, 14-2, . . . 14-n is memorized as the digital signal in the digital memory 16-1, 16-2, . . . 16-n, respectively. It is a matter of course that if the dynamic range of the analog illumination intensity information of each picture element is wide, it is necesary to effect a logarithmic compression or the like in a suitable manner. Such a role can be played by the digital-analog converter 15, for example.

As stated hereinbefore, the illumination intensity information of each picture element is memorized in n digital memories 16-1, 16-2, . . . 16-n corresponding to n picture elements as digital amount at substantially the same time during the time at which the central control circuit 5 supplies comparative digital signals, in the above described embodiment, 0000 to 1111. Subsequently, the central control circuit 5 functions to read out and treat the illumination information of each picture element stored in the digital memories 16-1, 16-2, . . . 16-n in a suitable manner. It is a matter of course that one of which digital memories 16-1, 16-2, . . . 16-n is read out, that is, one of which picture element information is used is determined through an address path 18 and decoder 19 by the central control circuit 5. If the treatment of obtaining a focal point detecting signal with the aid of the group 11 of the light detecting elements is completed in the central control circuit 5, the central control circuit 5 functions to select and treat the group 12 of the light detecting elements by the selection circuit 13 in a manner similar to the above, thereby obtaining a focal point detecting signal.

Figure 3:
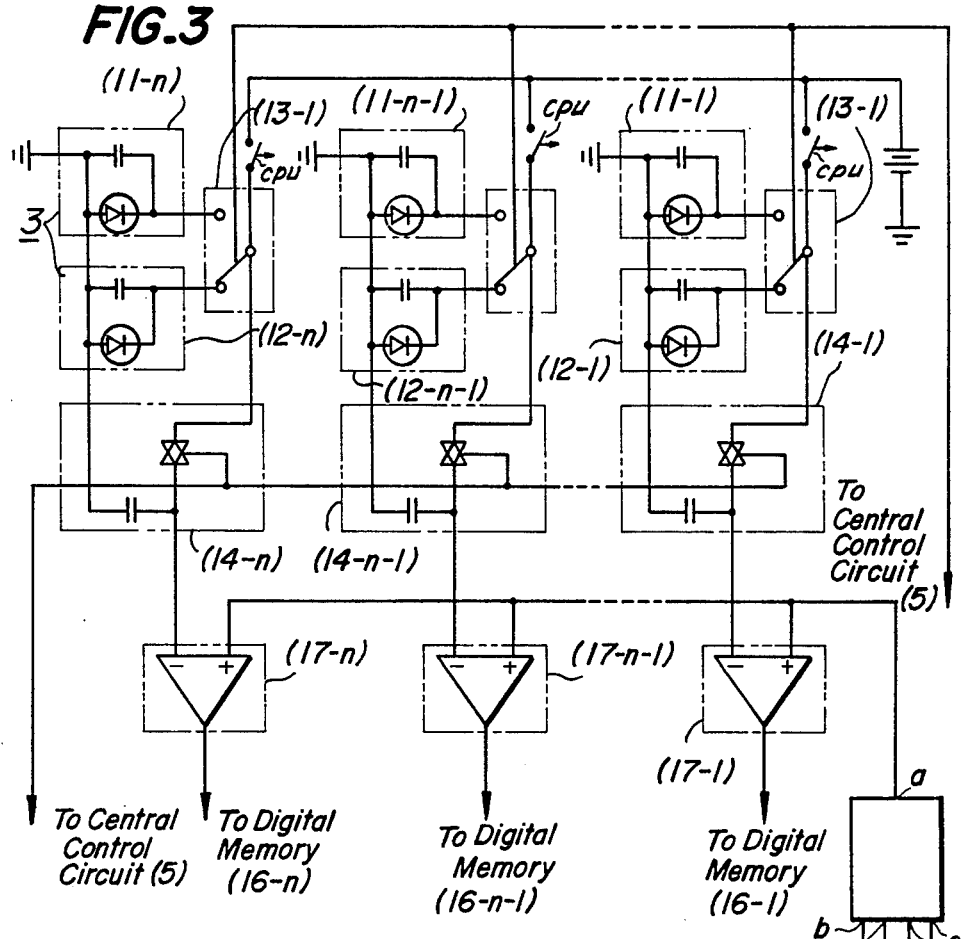
FIG. 3 is a detailed diagrammatic view of an example of the picture image signal treating circuit shown in FIG. 2.
Figure 4:
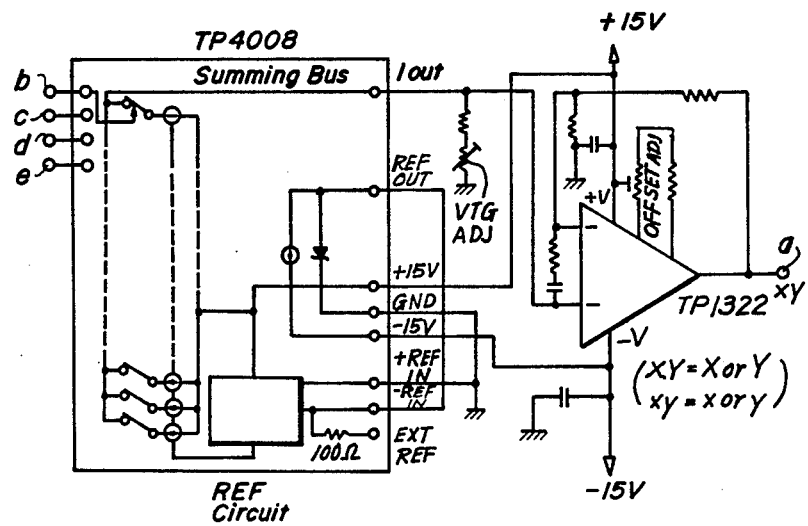
FIG. 4 is a detailed diagrammatic view of a digital-analog converter shown in FIG. 3.

FIG. 3 shows in detail an example of the picture image signal treating circuit shown in FIG. 2. In the present example, the light receiving element 3 is divided into two groups 11-n, 11-n-1, . . . 11-1 and 12-n, 12-n,-1 . . . 12-1 and each light receiving element is composed of a condenser and light receiving diode. The selection circuit 13 is divided into a plurality of switches 13-n, 13-n-1, . . . 13-1. Each selection circuit is made inoperative by a signal supplied from a central processing unit (cpu). Each of the plurality of sample hold circuits 14-n, 14-n-1, . . . 14-1 is composed of a condenser and an electronic switch. Each of the plurality of comparator circuits 17-n, 17-n-1, . . . 17-1 is composed of a differential amplifier. The digital-analog converter is shown in greater detail in FIG. 4. As the address decode circuit 19, use may be made of a circuit type SN 54154 4-line-to-16-line decoder/demultiplexer of Texas Instruments Incorporated. As the digital memory 16, use may be made of MO 14508 B dual 4 bits latch constructed with MOS P-chanel and N-channel enhancement mode devices in a single monolithic structure of Motrola Semiconductors.

Figure 5:
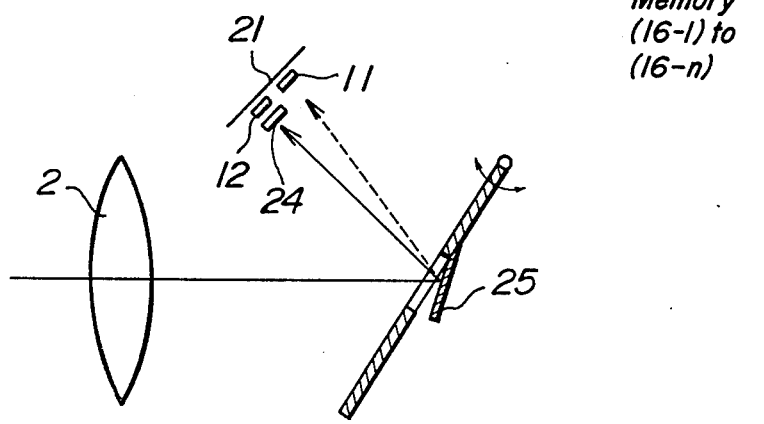
FIG. 5 is a diagrammatic view of an embodiment of an optical system for the apparatus shown in FIG. 1.

FIG. 5 shows an embodiment of an optical system for an apparatus for electrically detecting a focal point of cameras or the like optical devices with the aid of a picture image signal treating circuit according to the invention. In the present embodiment, adjacent to a predetermined focal plane 21 are arranged two groups 11, 12 of light detecting elements side by side and in front of the group 12 of light detecting elements is arranged a transparent plate 24 for adjusting the light path length. A focal point detecting light is incident through an optical system 2 and mirror 25 on the groups 11, 12 of light detecting elements. If the mirror 25 is minutely oscillated, the focal point detecting light is also oscillated to project the same portion of the light image onto the groups 11, 12 of the light detecting elements in an alternate manner. In front of the group 12 of light detecting element is arranged the transparent plate 24, so that the position of the light receiving surface of the group 12 of light detecting element is equivalent to the position in the rear of the predetermined focal plane 21. As a result, if the groups 11, 12 of light detecting elements are changed over by the selection circuit 13 so as to use either one of these groups, it is possible to obtain the same effect as in the case of detecting the focal point in front and rear of the predetermined focal plane 21. Thus, the direction of displacement of the focal point can also be detected. The light detecting elements in the groups 11, 12 may be arranged in longitudinal and transverse directions so as to form a grid or may be concentrically arranged.

The invention is not limited to the above described embodiments and various alternations and changes are possible. For example, the apparatus according to the invention is not limited to the use of detecting the focal point, but may be used for other picture image treatment in which a number of picture element informations must be digitally treated at a high speed. In the above described embodiment, the informations stored in the digital memories 16-1, 16-2, . . . 16-n are supplied to the central control circuit 5 and after the treatment has been completed the groups 11, 12 of light detecting elements are changed over one from the other. The illumination intensity information of the group of light detecting elements thus changed over is stored in the digital memories 16-1, 16-2, . . . 16-n.

Alternatively, all of the illumination intensity informations of the two groups 11, 12 of light detecting elements may be stored in the digital memories 16-1, 16-2, . . . 16-n and treated in association with each other.

The invention is capable of changing a number of picture element informations into digital informations at a high speed. As a result, when the invention is applied to the focal point detection, for example, a focal point of a movable object to be photographed can be detected. In addition, in the case of changing a number of picture element informations into digital informations at a high speed, use may be made of only one digital-analog converter.

In the embodiment shown in FIG. 2, the analog informations of all of the picture elements are treated in parallel, so that the treating speed is faster than that of the series reading out treatment. In addition, the use of the analog informations produced at the same instant provides the important advantage that the focal point can be detected in a more accurate manner.

What is claimed is:

1. In an improved apparatus for electrically detecting a focal point of cameras or the like, there is provided an optical device comprising, a plurality of light receiving elements arranged to receive light from at least one portion of an object image formed by an optical system and delivering a photoelectric signal, an analog-digital converter for converting a photoelectric signal from the light receiving elements into a digital signal and a control circuit for treating the digital signal and detecting an in-focal condition of the optical system, wherein the improvement comprises: a plurality of sample hold circuits connected to the plurality of light receiving elements and being operative to sample hold in parallel the photoelectric signal from the light receiving elements, a plurality of comparator circuits connected to said sample hold circuits and operative to compare in parallel the photoelectric current delivered from said sample hold circuits with an analog reference signal obtained from a digital-analog converter and changing in a step-shaped manner, and a plurality of digital memories connected to said comparator circuits and operative to write in parallel a digital signal delivered from the control circuit.

2. The apparatus according to claim 1, wherein: said plurality of light receiving elements are divided into two groups each of which is subjected in succession to all of said parallel focus detection operation.

* * * * *